United States Patent [19]

Efron et al.

[11] Patent Number: 5,031,412
[45] Date of Patent: Jul. 16, 1991

[54] ELECTRONIC EVAPORATIVE COOLER CONTROLLER

[76] Inventors: Paul Efron, 1026 E. Linden St., Tucson, Ariz., 85719; Billy J. Reynolds, 5601 S. 12th Ave. #612, Tucson, Ariz. 85706

[21] Appl. No.: 547,617

[22] Filed: Jul. 2, 1990

[51] Int. Cl.⁵ ............................................. F25B 19/00
[52] U.S. Cl. ..................................... 62/127; 62/231; 261/27
[58] Field of Search ................ 62/171, 231; 236/46 R; 165/12; 261/DIG. 34, 27

[56] References Cited

U.S. PATENT DOCUMENTS

4,232,531 11/1980 Mangam, Jr. et al. ................ 62/171
4,580,403 4/1986 Hummel ................................. 62/171
4,837,731 6/1989 Levine et al. ...................... 236/46 R

Primary Examiner—William E. Wayner
Attorney, Agent, or Firm—William E. Hein

[57] ABSTRACT

An electronic evaporative cooler controller includes a clock into which desired on and off times may be programmed. A pre-wet feature provides for engagement of the water pump for a period of time following turn on of the evaporative cooler to permit the cooler pads to become wet before the blower fan is engaged. A plurality of diagnostic visual indicators are provided to allow the user to quickly recognize faults that may occur in various components of the controller.

11 Claims, 8 Drawing Sheets

PRIOR ART
EVAPORATIVE COOLER
FIGURE 1

PRIOR ART
STANDARD COOLER SWITCH
FIGURE 2

ELECTRONIC EVAPORATIVE COOLER CONTROLLER

BACKGROUND AND SUMMARY OF THE INVENTION

This invention relates generally to evaporative coolers and more specifically to an electronic controller for such evaporative coolers. Evaporative coolers, also known as swamp coolers, are best suited to dry desert climates such as that found in the southwestern United States. Evaporative coolers generally comprise a generally cubical metal structure of three to four feet in length, height, and width that is mounted on the exterior of the roof of a building to be cooled. Four surfaces of the evaporative cooler comprise removabLe frames that contain pads made of shredded aspen wood or paper. The bottom of the evaporative cooler contains water to a depth that is controlled by a float to be about four inches. The water is circulated by a water pump through distribution tubes to the tops of the pads to keep them wet. A blower fan centrally located within the evaporative cooler pulls dry outside air through the wet pads and into a duct distribution system located within the building. Exemplary of such prior art evaporative coolers is that described in U.S. Pat. No. 4,379,712.

Evaporative coolers differ significantly from refrigeration or air conditioning units in a number of ways. Air conditioners employ a compressor and typically cost $200–$300 per month to operate on a demand basis, while an evaporative cooler typically costs only $35–$55 per month to operate on a 24-hour basis. An air conditioner simply recirculates the air inside the building, while an evaporative cooler permits fresh outside air, cooled through the wet pads of the evaporative cooler, to enter the building and exit through open windows. As a result, evaporative coolers deliver roughly three times the airflow volume delivered by air conditioners. In addition, air conditioners are cycled on and off during the course of the day and night by the thermostats that control them, whereas prior art evaporative coolers run continuously. Since the heat entering an air conditioned building must be removed by running the air conditioner compressor, no significant saving can be realized by turning an air conditioner off during part of the day, since it will simply run longer when turned on in order to remove the heat gained. In buildings cooled by an evaporative cooler, the heat gain is removed through open doors and windows.

One of the problems associated with prior art evaporative coolers is their high water usage on the order of 15–20 gallons per hour. Shutting the evaporative cooler off during the late night and early morning hours when it is not needed or at times when the building is not occupied can result in significant savings of water and electrical energy. For example, it has been estimated that approximately 10 billion gallons of water are used annually in Tucson, Arizona, in connection with the operation of residential evaporative coolers. This represents a significant portion of the total annual residential water usage of roughly 60 billion gallons for the entire state of Arizona.

Prior art evaporative coolers of the type commercially available are controlled by a simple rotary six-position manually operated switch that allows the user to select a combination of water pump and blower fan settings. These manual switches do not address the problem of high water usage of approximately 15–20 gallons per hour associated with the typical residential evaporative cooler. In the desert, water is precious, and the ability to control the operation of evaporative coolers would result in a significant saving of this Precious natural resource, as indicated by the example above. There have been a number of attempts in the prior art to solve the problem of controlling evaporative coolers through the use of thermostats. Exemplary of this prior art are U.S. Pat. Nos. 4,232,531, 4,560,972, 4,580,403, 4,673,028, and 4,775,100. However, control of evaporative coolers is not effectively accomplished using temperature responsive devices, for a number of reasons. In order for an evaporative cooler to work properly, some windows in the building must be open in order to relieve the air pressure created by the evaporative cooler. The open windows permit hot outside air to enter the building when the evaporative cooler is turned off by the thermostat, thereby causing rapid cycling of the evaporative cooler and defeating the purpose of the thermostat. Evaporative coolers do not recirculate and thereby mix the inside air. As a result, it is very difficult to position a thermostat for controlling an evaporative cooler in a location that will provide good temperature sensing. U.S. Pat. No. 4,560,972 describes a line voltage thermostat for controlling evaporative coolers. This device is intended to replace the conventional manually operated control switch. However, these manual switches are generally located in hallways or closets, which are unacceptable locations at which to sense the inside air temperature. In addition, thermostat control results in cooling the building, whether or not is occupied, thereby causing a waste of water and energy. The line voltage thermostats described in U.S. Pat. Nos. 4,775,100 and 4,569,972 have a wide range of plus or minus 20 degrees Fahrenheit in order to prevent rapid cycling of the evaporative cooler that would otherwise result from hot air entering the building through open windows. The use of these thermostats results in unpredictable cycling, and generally would result in the evaporative cooler being turned on and off once every day.

A problem associated with conventional manually operated evaporative cooler control switches is the fact that the blower fan motor and water pump stop and start each time the control switch is moved from one position to another. This stopping and starting causes undesirable wear of the blower fan motor and water pump. It is therefore an object of the present invention to provide a controller for evaporative coolers in which a time delay is imposed following each selection of a evaporative cooler function to inhibit starting of the blower fan motor and water pump. Another problem associated with prior art evaporative cooler controllers is the entrance of hot air into the building during start-up of the evaporative cooler, since approximately five minutes are required from the time the evaporative cooler is started until the pads become wet. During this time, the evaporative cooler blows hot air and creates an uncomfortable temperature environment within the building. It is therefore an object of the present invention to provide a controller for evaporative coolers having a pre-wet feature that causes engagement of the water pump for a period of time sufficient to wet the evaporative cooler pads before the blower fan motor is engaged. Yet another problem associated with prior art evaporative cooler controllers is the lack of electrical system diagnostics. It is therefore an object of the present invention to provide a controller for evaporative coolers having visual indicators for use in diagnosing faults in various components of the controller. U.S. Pat. Nos. 4,673,028 and 4,580,403 describe evaporative cooler controllers that require additional electrical wiring and constructional changes to buildings in which an evaporative cooler has been previously installed. It is therefore an object of the present invention to provide a controller for evaporative coolers that is adapted to directly replace a previously installed conventional manually operated control switch without the need for electrical wiring or structural changes.

DETAILED DESCRIPTION OF THE PREFERRED EMBODIMENT

Figure 1:
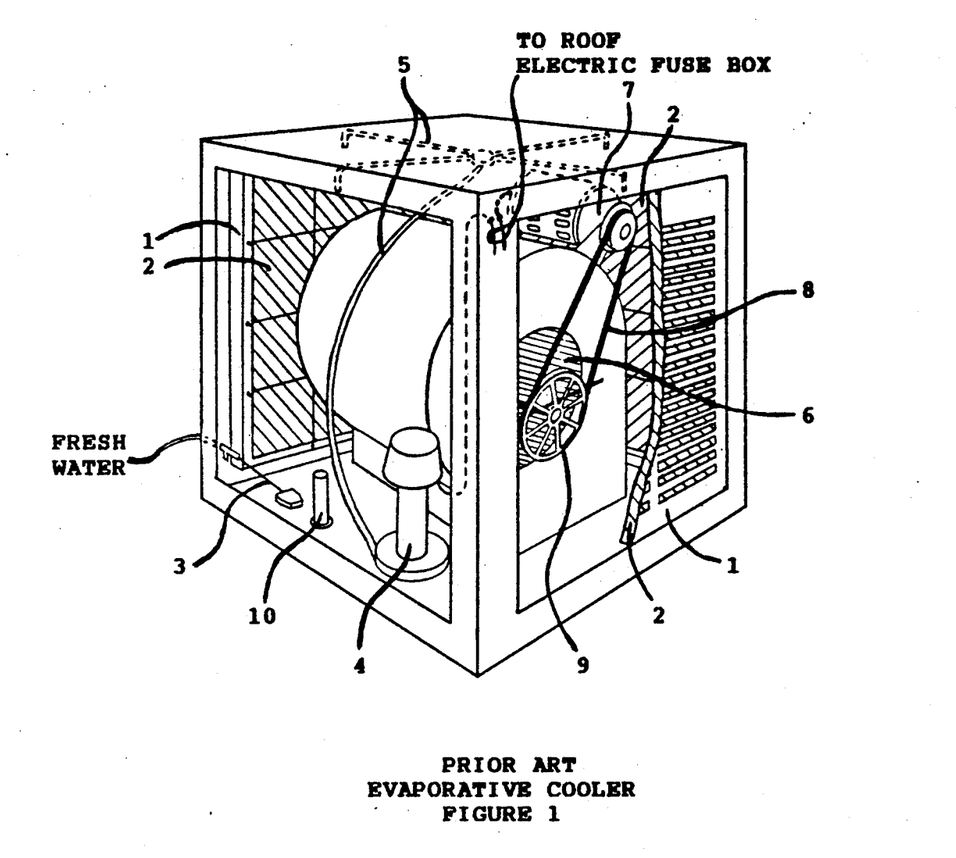
FIG. 1 is a pictorial diagram of a conventional evaporative cooler.
Figure 2:
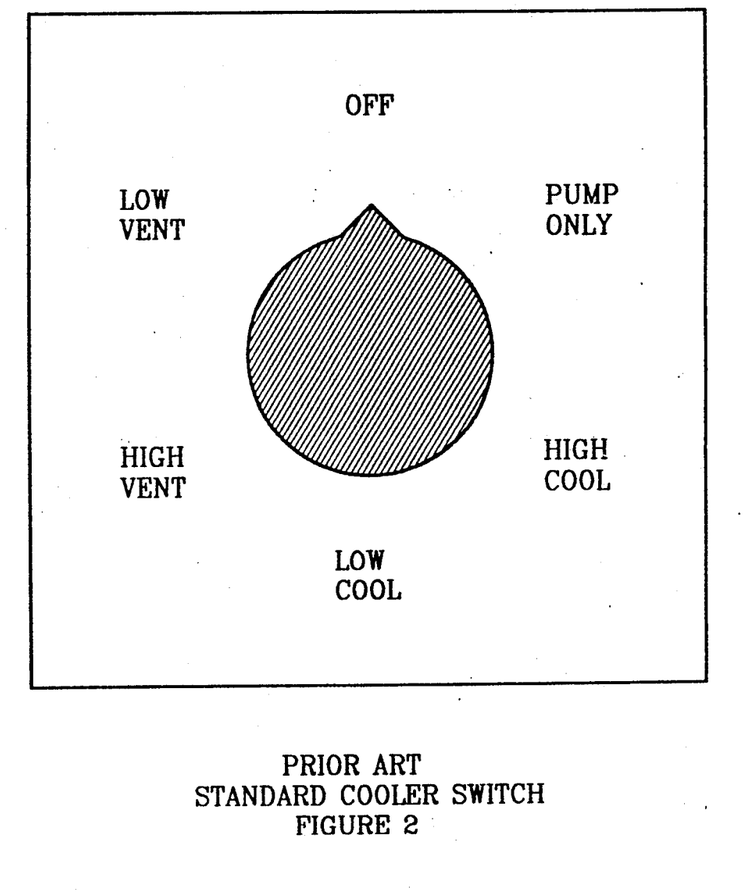
FIG. 2 is a diagram of a faceplate associated with a typical prior art manually operated control switch employed with evaporative coolers of the type shown in FIG. 1, illustrating the various functions that may be manually selected with such a control switch.

Referring now to FIG. 1, there is shown a conventional evaporative cooler that includes removable frames 1 on each of four side surfaces thereof. Frames 1 hold pads 2 that are typically constructed of shredded aspen wood or Paper. The bottom of the evaporative cooler comprises a tray that holds fresh water to a level of about four inches, controlled by a float 3. A water pump 4 circulates the water through a number of distribution tubes 5 to the top of each of the pads 2 to keep them wet. A centrally located blower fan 6 pulls outside air into the evaporative cooler through the wet pads 2 and into a duct distribution system within the building to be cooled. Blower fan 6 is powered by a motor 7, connected thereto by means of a belt 8 and a pulley 9. A removable overflow tube 10 is employed to drain water from the evaporative cooler to conduct normal maintenance and in the event of failure of float 3. The evaporative cooler of FIG. 1 is typically controlled by a manually operated rotary switch employed to select various water pump and blower fan functions. These functions are shown on the switch faceplate cover illustrated in FIG. 2.

Figure 3:
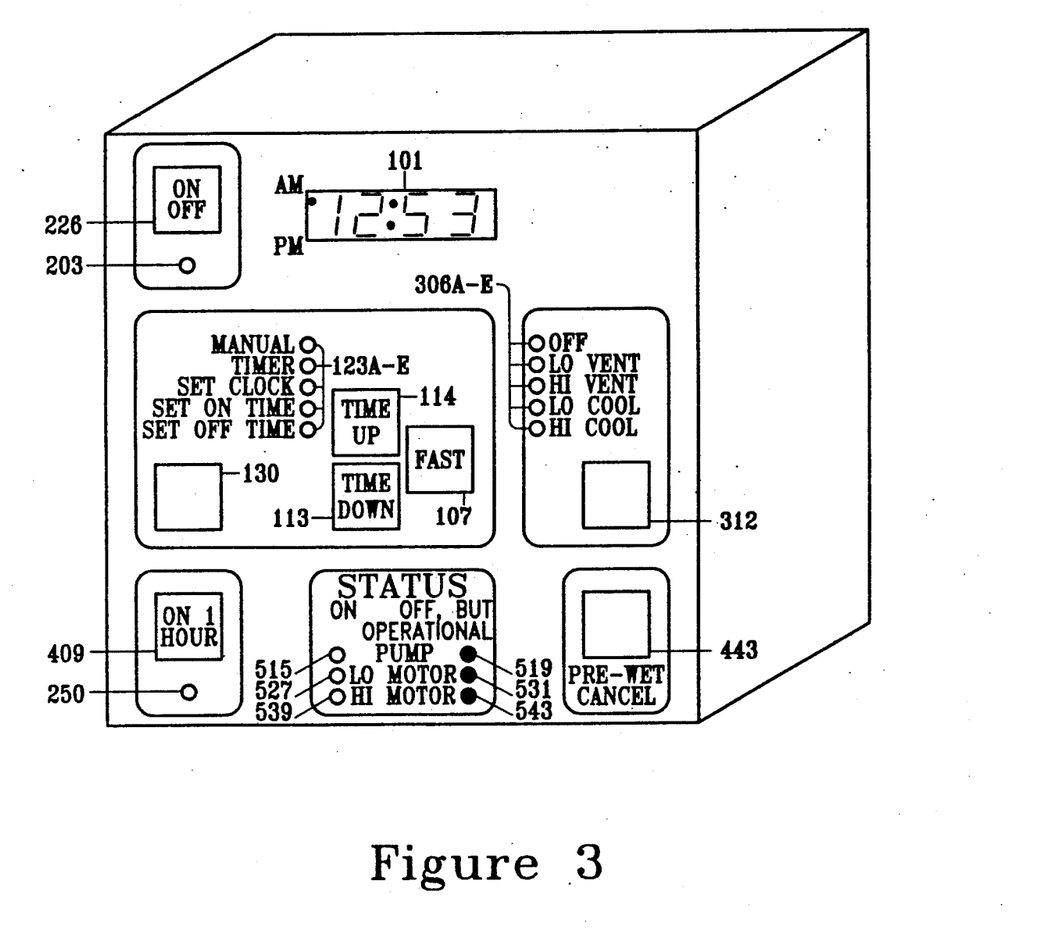
FIG. 3 is a diagram of the front panel of an evaporative cooler controller constructed in accordance with the present invention.
Figure 4A:
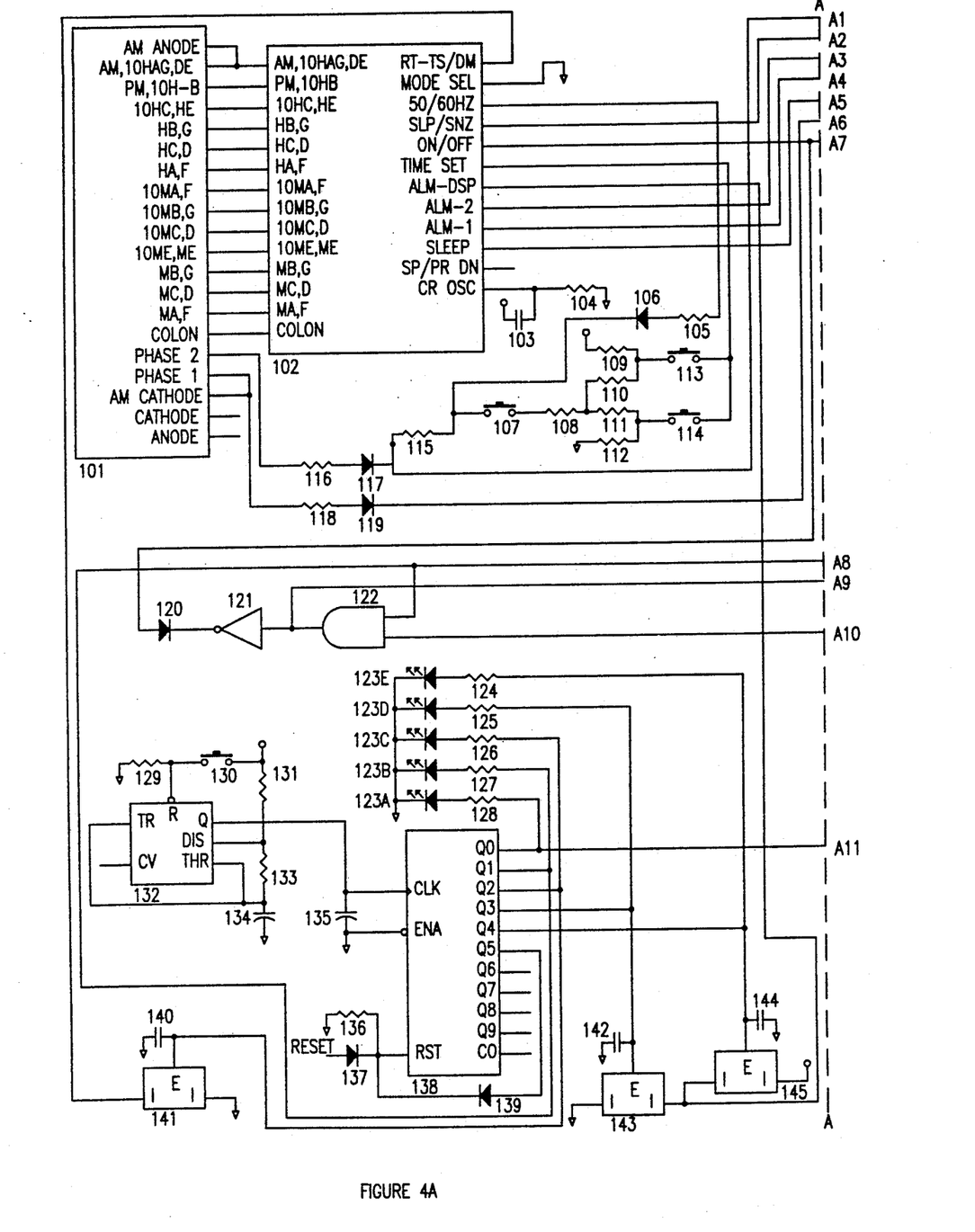
FIGS. 4A-E are a detailed schematic circuit diagram of an evaporative cooler controller constructed in accordance with the present invention.
Figure 4B:
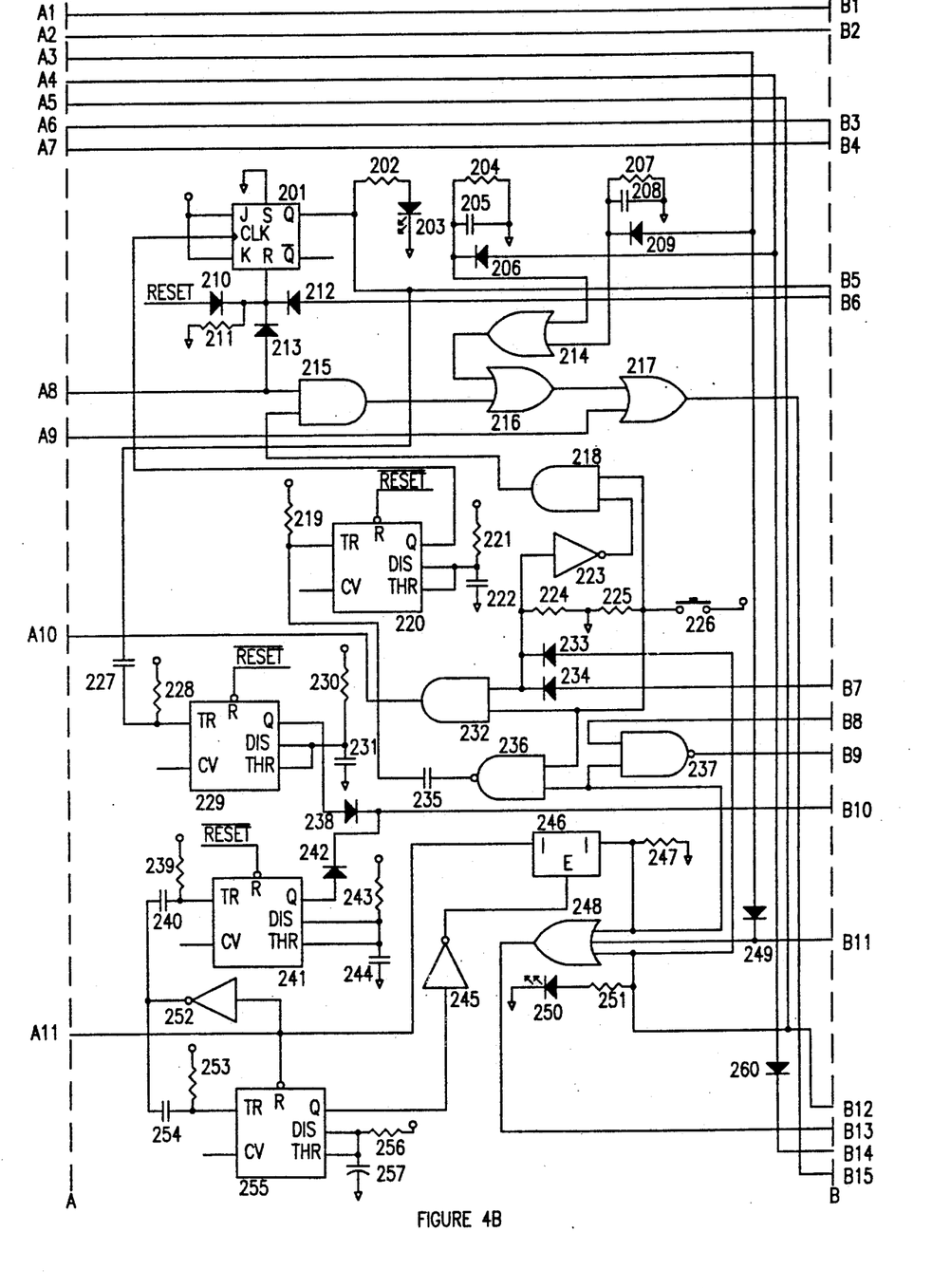
Figure 4C:
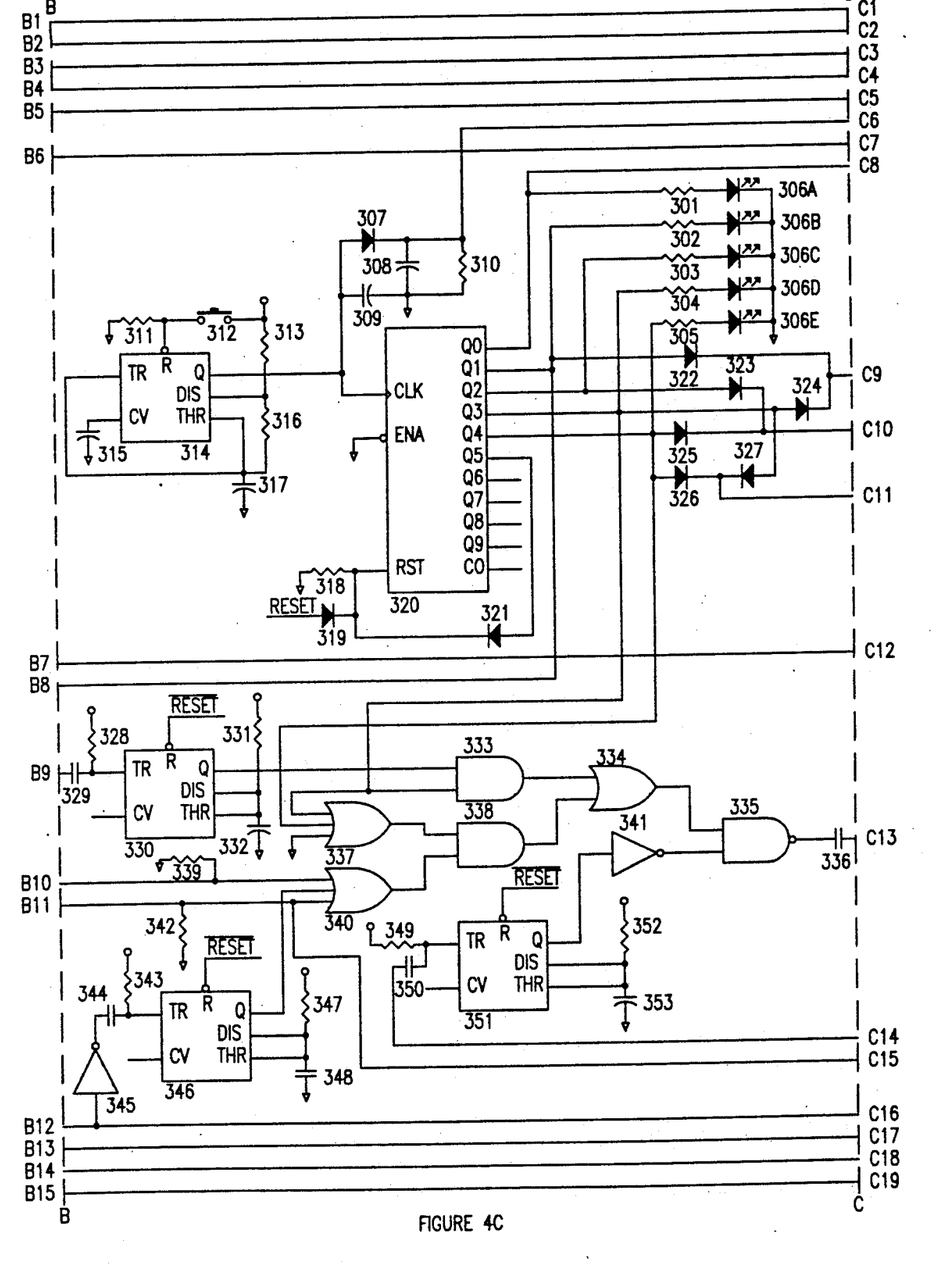
Figure 4D:
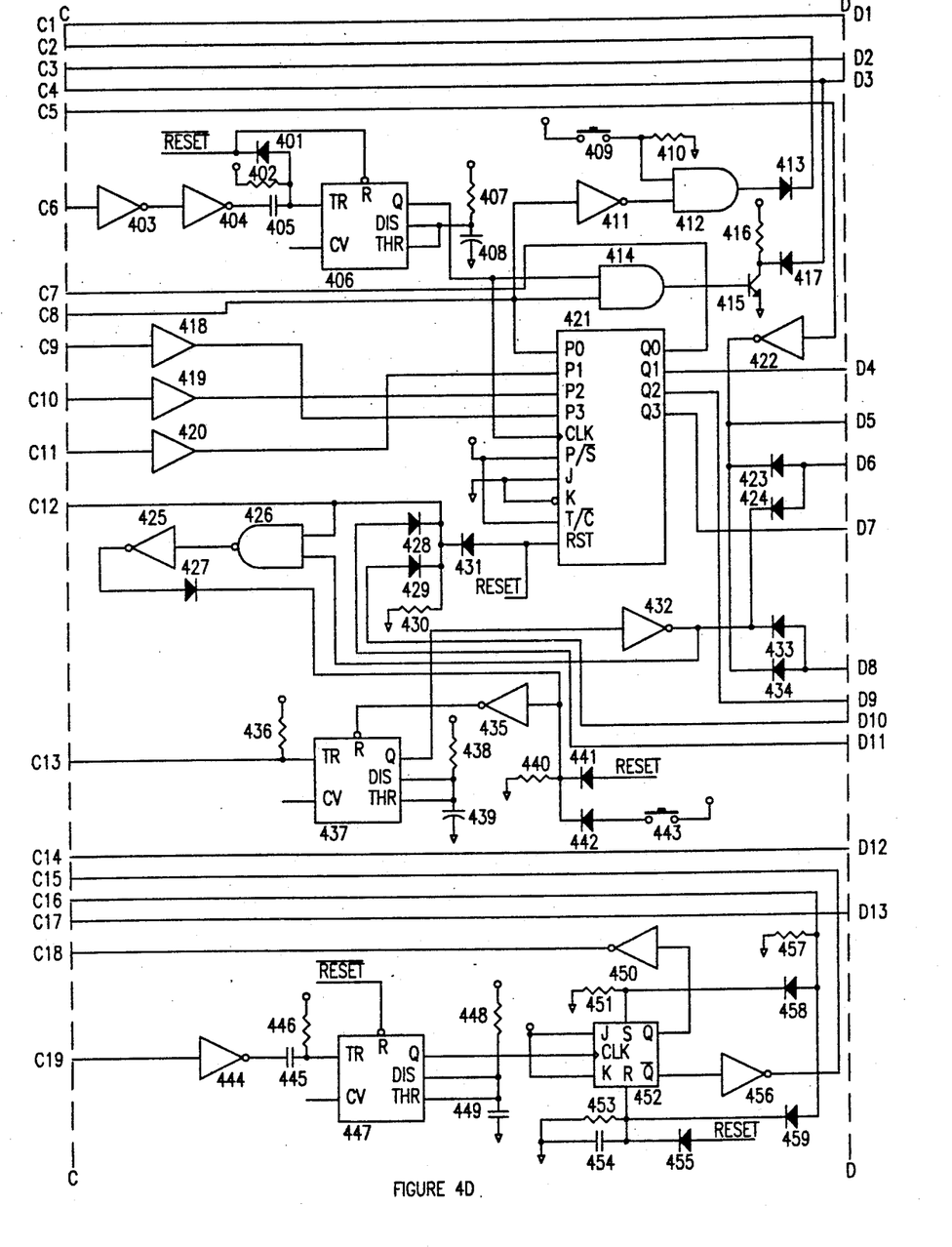
Figure 4E:
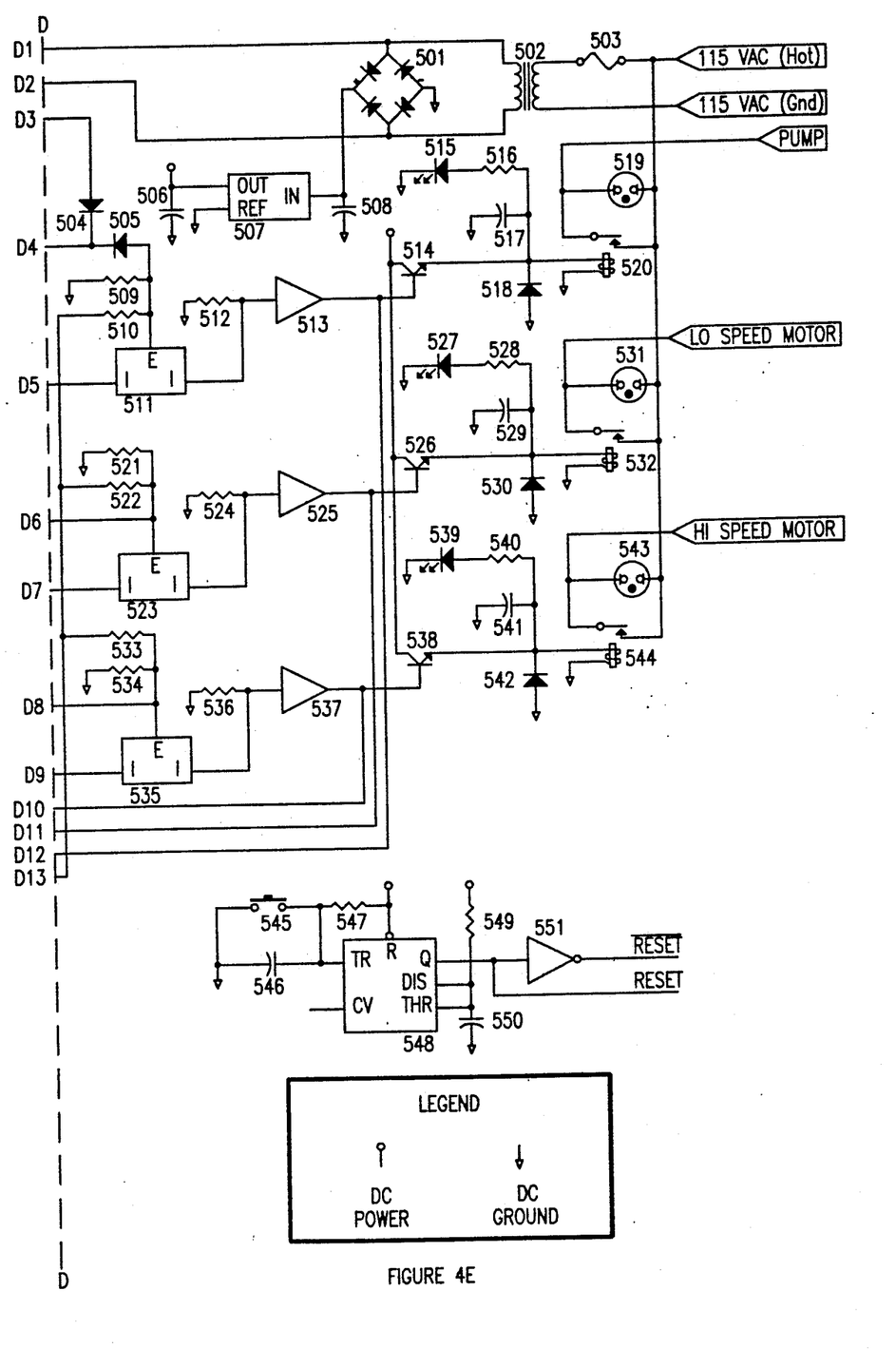

The evaporative cooler controller of the present invention includes a front panel, as illustrated in FIG. 3. The front panel contains a clock display 101, a number of light emitting diode (LED) indicators 123A-E, 203, 250, 306A-E, 515, 527, and 539, three miniature neon lamps 519, 531, 542, and eight push button switches 107, 113, 114, 130, 226, 312, 409, 443. A cooler function switch 312 is employed to select the evaporative cooler functions of OFF, LO VENT, HI VENT, LO COOL, and HI COOL. LED indicators 306A-E are sequentially illuminated in response to repeated actuation of function switch 312 to signify the selected function. Alternatively, switch 312 may be held down to repeatedly step through the selectable functions at the rate of one/second. The evaporative cooler will only initiate the selected function after a two-second delay following selection of the desired function. This delay prevents undesirable starting and stopping of the evaporative cooler blower fan and water pump during the function selection process.

A time function switch 130 selects various time functions that comprise MANUAL, TIMER, SET CLOCK, SET ON TIME, and SET OFF TIME. Operation of time function switch 130 to step through the available time functions is similar to that of cooler function switch 312. The MANUAL time function is selected to turn the evaporative cooler on regardless of the selected clock function or the time of day. When the MANUAL time function is selected, the evaporative cooler will operate in the function mode selected by cooler function switch 312. Selection of the ON TIMER time function results in the evaporative cooler being turned on and off according to the timer. The SET CLOCK, SET ON TIME, and SET OFF TIME time functions are used to set the present time, desired on time, and desired off time, respectively. To set these time functions, the user simply steps through the available time functions using the time function switch 130. One of the LED indicators 123A-E will be illuminated to signify the selected time function, and the display 101 will show the appropriate time. To set the time desired, the user employs a TIME UP switch 114 and a TIME DOWN switch 113 until the desired time is displayed. The time will scroll at the approximate rate of two minutes per second while either of the TIME UP or TIME DOWN switches 114, 113 is actuated. Pressing a FAST switch 107 while holding down either of the TIME UP or TIME DOWN switches 114, 113 will cause the displayed time to scroll at the rate of approximately one hour per second.

An ON/OFF switch 226 toggles the evaporative cooler between on and off, without affecting the timing cycle. LED indicator 203 is illuminated when the ON/OFF switch 226 is used to turn off the evaporative cooler. LED indicator 203 will be illuminated only if the time function selected is MANUAL.

The ON 1 HOUR switch 409 is employed to turn the evaporative cooler on for one hour. When this switch is actuated, "0:59" will be indicated in display 101. If the ON 1 HOUR switch is held down while the TIME DOWN switch 113 is actuated, the display 101 will count down from 59 minutes to set a shorter time during which the evaporative cooler is turned on. An LED indicator 250 is illuminated while the ON 1 HOUR function is active.

A PUMP LED indicator 515, LO MOTOR ON LED indicator 527 and/or HI MOTOR ON LED indicator 539 will be illuminated when the water pump or blower fan motor is running. When either the HI COOL or LO COOL function has been selected, the water pump will automatically operate for five minutes before the blower fan motor is turned on to permit the pads to become wet before drawing outside air into the evaporative cooler. As stated above, this pre-wet feature prevents the blower fan from blowing hot air into the building during the time that the pads are becoming wet. The PUMP ON LED indicator 515 signifies to the user that the evaporative cooler controller is operating properly during the five-minute pre-wet cycle, while he may otherwise believe that a malfunction has occurred because the blower fan has not come on. The pre-wet cycle can be canceled by actuating the PRE-WET CANCEL switch 443.

A PUMP neon lamp 519, LO MOTOR OFF neon lamp 531, and HI MOTOR OFF neon lamp 543 will be illuminated when the water pump or blower fan motor is off. These neon lamps will be illuminated when there is continuity in the water pump or blower fan motor circuits. If these neon lamps do not illuminate when the evaporative cooler is turned off, a fault is indicated in the water pump, blower fan motor, circuit breaker or fuses.

Referring now to the detailed schematic circuit diagram of FIGS. 4A-E, a duplex LED display 101 is connected to the output side of a clock chip 102 that may comprise a Texas Instruments TMS3459BNL two alarm clock chip. A PHASE 2 line of the display 101 is routed through a current limiting resistor 116 to the anode of a diode 117, thus permitting passage of only the negative cycles of AC voltage that originate at the first secondary winding of a power transformer 502. PHASE 1 and AM CATHODE lines of the display 101 are routed through current limiting resistor 118 to the anode of diode 119, thus permitting passage of only the negative cycles of AC voltage that originate at the remaining secondary winding of the power transformer 502. The PHASE 1 and AM CATHODE lines are 180 degrees out of phase with the PHASE 2 line.

The RT-TS/DIM (real time-time set/dimmer) output of clock chip 102 is connected to the output of an analog switch 141. The input of the analog switch 141 is connected to DC ground. By enabling the analog switch 141, the time of day of the clock chip 102 may be set with an input to the TIME SET line of clock chip 102. The TIME SET line of clock chip 102 is connected to the TIME UP switch 114 and to the TIME DOWN switch 113. The opposite side of TIME UP switch 114 is connected to voltage divider resistors 111 and 112. The opposite side resistor 112 is connected to DC ground. The opposite side of TIME DOWN switch 113 is connected to voltage divider resistors 109 and 110. The opposite sides of resistors 110 and 111 are connected together and are connected through a resistor 108 to a FAST switch 107. The opposite side of FAST switch 107 is connected to the junction formed by the anode of diode 106 and a current limiting resistor 115. By actuating the TIME UP switch 113, a positive Potential that is less than the DC operating voltage is applied to the TIME SET line of clock chip 102. By actuating the FAST switch 107 together with either the TIME UP switch 114 or the TIME DOWN switch 113, a 60-hertz voltage is applied to the TIME SET line of the clock chip 102.

A MODE SEL (mode select) line of clock chip 102 is connected to DC ground, thereby setting the mode of the clock chip 102 to 12 hours and 60 hertz. The 50/60HZ line of clock chip 102 provides a time base and is connected through a current limiting resistor 105 to the anode of diode 106. The cathode of diode 106 is connected to a current limiting resistor 115.

A CR OSC (crystal oscillator) line of clock chip 102 is connected to a resistor 104 and a capacitor 103. The opposite side of resistor 104 is connected to DC ground. The opposite side of capacitor 103 is connected to the source of DC operating voltage, thereby setting the accuracy of the clock 102.

An ALM-DSP SEL (alarm-display select) line of clock chip 102 is connected to the outputs of analog switches 143 and 145. The input of analog switch 143 is connected to DC ground. When analog switch 143 is enabled, DC ground is applied to the ALM-DSP SEL line of clock chip 102, thereby causing the display 101 to display the SET ON TIME to the user. The input of analog switch 145 is connected to the source of DC operating voltage. When analog switch 145 is enabled, DC operating voltage is applied to the ALM-DSP SEL line of the clock chip 102, thereby causing the display 101 to display the SET OFF TIME to the user.

An R (reset) line of timer/oscillator 132 is connected to resistor 129 and to the time function switch 130. The opposite side of resistor 129 is connected to DC ground. The opposite side of time function switch 130 is connected to the source of DC operating voltage. Resistor 129 holds timer/oscillator 132 in the reset mode until the function switch 130 is actuated. This causes timer/oscillator 132 to issue a pulse train from the Q (output) line of timer/oscillator 132 to the CLK (clock) line of decade counter/divider 138. The frequency of this pulse train is determined by the RC time constant created by resistors 131 and 133 and by capacitor 134. This pulse train is stabilized by capacitor 135, thereby preventing false triggering.

An ENA (enable) line of decade counter/divider 138 is connected to DC ground, thereby constantly enabling this device. The pulse train issued at the Q line of timer/oscillator 132 causes the decade counter/divider 138 to stop issuing pulses on output Q0 and to instead issue pulses on outputs Q1, Q2, Q3, Q4, and Q5. When output Q5 becomes active, a signal is sent through diode 139 to the RST (reset) line of decade counter/divider 138 to cause it to reset to output Q0. This cycle will repeat continuously until the pulse train from timer/oscillator 132 is stopped. Outputs Q0-Q4 of decade counter/divider 138 correspond to the MANUAL, TIMER, SET TIME, SET ON TIME, and SET OFF TIME time functions, respectively that are selected by time function switch 130. These outputs result in illumination of the appropriate ones of LED indicators 123A-E. Outputs Q2, Q3, and Q4 of decade counter/divider 138 also enable analog switches 141, 143, and 145, respectively. Capacitors 140, 142, and 144 serve to debounce these analog switches. Output Q0 of decade counter/divider 138 is also connected to the input of analog switch 246, the input of a Schmitt trigger inverter 252, and the R (reset) line of timer/oscillator 255.

If output Q0 of decade counter/divider 138 is not active, timer/oscillator 255 is held in a reset mode. When output Q0 becomes active, a high signal is sent to the input of Schmitt trigger inverter 252. The output of Schmitt trigger inverter 252 sends a low signal through capacitor 254 to timer/oscillator 255 which in turn sends a high pulse to the input of the Schmitt trigger inverter 245. This disables analog switch 246 for a period of time determined by the RC time constant of resistor 256 and capacitor 257. After this time period, the analog switch 246 is again enabled and sends a signal to the first input of a three input OR gate 248 and to the second inputs of Schmitt trigger NAND gates 236 and 237. The output of three input OR gate 248 sends a signal through resistors 510, 522, and 533 to the ENA (enable) line of analog switches 511, 523, and 535, respectively.

The output of Schmitt trigger inverter 252 also sends a low signal through capacitor 240 to a TR (trigger) line of timer/oscillator 241. The output Q of timer/oscillator 241 sends a signal through isolation diode 242 to the first input of three input OR gate 340 and pull down resistor 339. The output of three input OR gate 340 is connected to the second input of AND gate 338. When the time function is changed from SET OFF TIME to MANUAL, and the time has elapsed on timer/oscillator 255, a signal is sent to start the pre-wet cycle if the pre-wet cycle is enabled by timer/oscillator 351 at Schmitt trigger NAND gate 335.

The R (reset) line of timer/oscillator 314 is connected to resistor 311 and to cooler function switch 312. The opposite side of resistor 311 is connected to DC ground. The opposite side of cooler function switch 312 is connected to the source of DC operating voltage. Resistor 311 holds timer/oscillator 314 in the reset mode until the cooler function switch 312 is actuated. This causes timer/oscillator 314 to send a pulse train from the Q (output) line to the CLK (clock) line of decade counter/divider 320. The oscillation rate of this pulse train is determined by the RC time constant of resistors 313 and 316 and capacitors 315 and 317.

The ENA (enable) line of decade counter/divider 320 is connected to DC ground, thereby constantly enabling this device. The pulse train sent from timer/oscillator 314 causes the decade counter/divider 320 to change from output Q00 to outputs Q1, Q2, Q3, Q4, and Q5. When output Q5 becomes active, it sends a signal through diode 321 to the RST (reset) line of decade counter/divider 320 to cause the device to reset to output Q0. This cycle will repeat continuously until the pulse train from timer/oscillator 3314 is stopped. Outputs Q0-Q4 of the decade counter/divider 320 correspond to the OFF, LO VENT, HI VENT, LO COOL, and HO COOL functions, respectively. These outputs illuminate the appropriate ones of LED indicator 306A-E.

Outputs Q3 and Q4 of decade counter/divider 320 send signals to the first and second inputs of three input OR gate 337. The output of three input OR gate 337 sends a signal to the first input of AND gate 338. The output of AND gate 338 sends a signal to the second input of OR gate 334. The output of OR gate 334 sends a signal to the first input of Schmitt trigger NAND gate 335. The output of Schmitt trigger NAND gate 335 sends a low signal through capacitor 336 to the TR (trigger) line of timer/oscillator 437. Timer/oscillator 437 will send a pulse from output Q to the input of Schmitt trigger inverter 432 after an adequate amount of time for the evaporative cooler pads to become wet. The output of Schmitt trigger inverter 432 sends a low signal through the cathode of diodes 424 and 433, thereby disabling analog switches 523 and 535. Analog switches 523 and 535 will be disabled, thereby preventing operation of the evaporative cooler blower fan motor during the pre-wet cycle.

Output Q1 of decade counter/divider 320 sends a signal through diode 322 via buffer 418 to line P3 of parallel/serial shift register 421. Output Q2 of decade counter/divider 320 sends a signal through diode 323 via buffer 419 to line P2 of parallel/serial shift register 421. Output Q3 of decade counter/divider 320 sends a signal through diode 327 via buffer 420 to line P1 of parallel/serial shift register 421. Output Q3 of decade counter/divider 320 also sends a signal through diode 324 to the input of buffer 418.

Output Q4 of decade counter/divider 320 sends a signal through diode 325 to the input of buffer 419. Output Q4 of decade counter/divider 320 also sends a signal through diode 326 to the input of buffer 420. The CLK (clock) line of decade counter/divider 320 sends a signal through a time delay network consisting of diode 307, capacitors 308 and 309, and resistor 310. This signal is applied through Schmitt trigger inverters 403 and 404 and capacitor 405 to the TR (trigger) line of timer/oscillator 406. The output of timer/oscillator 406 is applied to a second input of AND gate 414 and to the CLK (clock) line of parallel/serial shift register 421.

The P/S (parallel/serial not) and T/C* (true/complementary not) lines of parallel/serial shift register 421 are connected to the source of DC operating voltage, thereby selecting the parallel and true mode. J and K are serial inputs that are not used and are therefore connected to DC ground. Output Q0 of decade counter/divider 320 is applied to the P0 line of parallel/serial shift register 421, the first input of AND gate 414, and the input of Schmitt trigger inverter 411. The output of Schmitt trigger inverter 411 is applied to the input of AND gate 412. When a pulse is issued on output line Q of timer/oscillator 406 to the CLK line of parallel/serial shift register 421, input lines P0-P3 of parallel/serial shift register 421 shift to a latch output lines Q0-Q3. This occurs when cooler function switch 312 is actuated to step through functions OFF, LO VENT, HI VENT, LO COOL, and HI COOL. After a short period of time elapses, the pulse issued to parallel/serial shift register 421 causes the choice of water pump and blower fan motor settings to engage. This is done to prevent the water pump and blower fan motor from turning on and off as the desired function is selected by means of cooler function switch 312.

ON ONE HOUR switch 407 applies DC operating voltage to the first input of AND gate 412. This activates the ON ONE HOUR cycle by using the sleep function of the clock chip 102. AND gate 412 and Schmitt trigger inverter 411 are used to prevent the ON ONE HOUR cycle from activating when the OFF function is selected. If both inputs of AND gate 414 are high, a signal is applied to the base of transistor 415. This turn transistor 415 on, sending a negative signal through diode 417 to the ON/OFF line of clock chip 102, thereby resetting the ON ONE HOUR cycle. In order for this to occur, the OFF function must be selected by cooler function switch 312 and timer/oscillator 406 must be triggered. Timer/oscillator 406 is triggered when time runs out on the time delay network previously described.

Outputs Q1, Q2, and Q3 of parallel/serial shift register 421 send signals to the inputs of analog switches 511, 535, and 523, respectively. The outputs of analog switches 511, 523, and 535 send signals to the inputs of buffers 513, 525, and 537, respectively. The outputs of buffers 513, 525, and 537 send signals to the bases of transistors 514, 526, and 538, whose emitters will go high if the bases are high. High signals from transistors 514, 526, and 538 will engage corresponding relays 520, 532, and 544, thereby initiating operation of the water pump and/or blower fan motor. High signals from transistors 514, 526, and 538 will also illuminate PUMP ON LED indicator 515, LO MOTOR LED indicator 527, and HI MOTOR ON LED indicator 539, respectively.

The cathodes of diodes 518, 530, and 542 are connected to the coils of relays 520, 532, and 544 to absorb their collapse, thereby preventing back current. Capacitors 517, 529, and 541 are connected to the coils of relays 520, 532, and 544 to reduce clatter during evaporative cooler setting changes. When relays 520, 532, and 544 engage, their contacts close, thereby connecting line voltage (115 or 230 VAC) to the PUMP, LO SPEED MOTOR and/or HI SPEED MOTOR. When relays 520, 532, and 544 are engaged, they will turn off PUMP OFF neon lamp 519, LO MOTOR OFF neon lamp 531, and HI MOTOR OFF neon lamp 543, respectively.

A high signal to transistor 514 is also applied to capacitor 350 to trigger timer/oscillator 351. Timer/oscillator 351 will send a pulse from output Q to the input of Schmitt trigger inverter 341 after a time delay determined by the time constant of resistor 352 and capacitor 353. This time delay allows an adequate amount of time for the evaporative cooler pads to dry. The output of Schmitt trigger inverter 341 is connected to the input of Schmitt trigger NAND gate 335 to disable the pre-wet cycle.

The outputs of buffers 525 and 537 are connected to the anodes of diodes 428 and 429. The cathodes of diodes 428 and 429 are connected to the first input of Schmitt trigger NAND gate 426. The second input of Schmitt trigger NAND gate 426 is connected to the cathodes of diodes 424 and 433. The second input of Schmitt trigger NAND gate 426 is also connected to the output of Schmitt trigger inverter 432. The output of Schmitt trigger NAND gate 426 is connected to the input of Schmitt trigger inverter 425. The output of Schmitt trigger inverter 425 is connected to the anode of diode 427. The cathode of diode 427 is connected to the input of Schmitt trigger inverter 435, as well as to the cathodes of diodes 441 and 442 and to resistor 440. The anode of diode 442 is connected to PRE-WET CANCEL switch 443, actuation of which will cancel the pre-wet cycle.

The ALM-1 (alarm 1) line of clock chip 102 is connected to the anode of diode 206. The cathode of diode 206 is connected to the first input of OR gate 214. A filter network comprises resistor 204 and capacitor 205. The ALM-2 (alarm 2) line of clock chip 102 is connected to the anode of diode 209. The cathode of diode 209 is connected to the second input of OR gate 214. Another filter network comprises resistor 207 and capacitor 208. The output of OR gate 214 is connected to the first input of OR gate 216. The output of OR gate 216 is connected to the first input of OR gate 217. The output of OR gate 217 is connected to the input of Schmitt trigger inverter 444. Schmitt trigger inverter 444 issues a signal through capacitor 445 to the TR (trigger) line of timer/oscillator 447. The time constant determined by resistor 448 and capacitor 449 creates a short pulse from output Q of timer/oscillator 447 to the CLK (clock) line of J/K flip flop 452.

The J and K lines of J/K flip flop 452 are connected to the source of DC operating voltage. The S (set) and R (reset) lines of J/K flip flop 452 are pulled to DC ground by pull down resistors 451 and 453. This setting of the J, K, S, and R lines places J/K flip flop 452 in the toggle mode. Output Q of J/K flip flop 452 is connected to the input of Schmitt trigger inverter 450. Output not Q. of J/K flip flop 452 is connected to the input of Schmitt trigger inverter 456. The output of Schmitt trigger inverter 456 is connected to the third input of three input OR gate 340.

The output of Schmitt trigger inverter 450 is connected to the cathode of diode 260. The anode of diode 260 is connected to the ALM-1 (alarm 1) line of clock chip 102. This disables the alarm 1 function of clock chip 102, thereby preventing false triggering. The output of Schmitt trigger inverter 456 is also connected to the second input of three input OR gate 248. This enables analog switches 511, 523, and 535 and turns the evaporative cooler on at the designated ON TIME.

The SLEEP line of clock chip 102 is connected to the anodes of diodes 458 and 459, to the input of Schmitt trigger inverter 345, to the third input of three input OR gate 248, to resistors 457 and 251, and to the anode of diode 233. The cathodes of diodes 458 and 459 are connected to the S (set) and R (reset) lines of J/K flip flop 452, thereby disabling the ON TIME and OFF TIME functions. This prevents triggering from the clock chip 102 during the ON ONE HOUR cycle. Capacitor 454 introduces a delay on the R (reset) line for a period of time to allow J/K flip flop 452 to be set before it is reset.

The output of Schmitt trigger inverter 345 is applied through capacitor 344 to the TR (trigger) line of timer/oscillator 346. The output Q of timer/oscillator 346 is applied to the second input of three input OR gate 340 to initiate the pre-wet for the ON ONE HOUR cycle. The opposite side of resistor 251 is connected to ON ONE HOUR LED indicator 250. The output of three input OR gate 248 enables analog switches 511, 523, and 535, thereby turning the evaporative cooler on for the ON ONE HOUR cycle.

Output Q1 of decade counter/divider 320 is connected to the first input of Schmitt trigger NAND gate 237. The output of Schmitt trigger NAND gate 237 is applied through capacitor 329 to the TR (trigger) line of timer/oscillator 330. The oscillation rate determined by the RC time constant created by resistor 331 and capacitor 332 allows sufficient time to select the LO COOL function before the pre-wet function is disabled.

The output Q of timer/oscillator 330 is connected to the first input of AND gate 333. The output of AND gate 333 is connected to the first input of OR gate 334. Output Q3 of decade counter/divider 320 is connected to the first input of OR gate 334. This provides the pre-wet cycle for the MANUAL time function. Line Q0 of parallel/serial shift register 421 is applied to the anode of diode 212. The cathode of diode 212 is connected to the R (reset) line of J/K flip flop 201, which resets the ON/OFF function for the MANUAL time function.

The ON/OFF switch 226 is connected to the source of DC operating voltage. The opposite side of ON/OFF switch 226 is connected to the first input of Schmitt trigger NAND gate 236, to the first input of AND gate 218, to the second input of AND gate 232, and to resistor 225. Schmitt trigger NAND gate 236 applies a signal through capacitor 235 to the TR (trigger) line of timer/oscillator 220. The time constant determined by resistor 221 and capacitor 222 creates a short pulse from output line Q of timer/oscillator 220 to the CLK (clock) line of J/K flip flop 201.

The J and K lines of J/K flip flop 201 are connected to a source of DC operating voltage, and the S (set) line is connected to DC ground. The R (reset) line of J/K flip flop 201 is pulled to DC ground by pull down resistor 211. J/K flip flop 201 is thereby placed in the toggle mode. Output Q of J/K flip flop 201 is connected to resistor 202 for ON/OFF LED indicator 203, through capacitor 227 to the TR (trigger) line of timer/oscillator 229, and to the input of Schmitt trigger inverter 422. The output of Schmitt trigger inverter 422 is connected to the cathodes of diodes 423, 434, 504, and 505. This disables analog switches 511, 523, and 535 when the evaporative cooler is turned off using the ON/OFF switch 226 when the MANUAL mode has been selected by time function switch 130. This also disables the SLEEP line of clock chip 102, thereby preventing selection of the ON ONE HOUR cycle.

Output Q of timer/oscillator 229 is connected to the anode of diode 238. The cathode of diode 238 is connected to the cathode of diode 242. This provides the trigger for the pre-wet cycle when making a selection from OFF to ON in the MANUAL mode. Timer/oscillator 220 will function only when the ON/OFF switch 226 is actuated during the MANUAL mode. The first input of AND gate 232 is connected to the input of Schmitt trigger inverter 223, the cathodes of diodes 233 and 234, and resistor 224. The output of Schmitt trigger inverter 223 is connected to the second input of AND gate 218. The output of AND gate 232 is connected to the second input of AND gate 122.

Output Q1 of decade counter/divider 138 sends a signal to the first input of AND gate 122, the first input of AND gate 215, and the anode of diode 213. The output of AND gate 122 is connected to the input of Schmitt trigger inverter 121 and the second input of OR gate 217. The output of Schmitt trigger inverter 121 is connected to the anode of diode 120. The cathode of diode 120 is connected to the ON/OFF line of clock chip 102 and to the anodes of diodes 417 and 504. The output of AND gate 218 is connected to the second input of AND gate 215. The output of AND gate 215 is connected to the input of OR gate 216. The anode of diode 234 is connected to the junction of the first input of Schmitt trigger NAND gate 426, to the cathodes of diodes 428, 429, and 431, and to resistor 430. This provides a high signal when LO MOTOR or HI MOTOR is on.

The cathode of diode 213 is connected to the cathodes of diodes 210 and 212, to resistor 211, and to the R (reset) line of J/K flip flop 201. The R (reset) line of J/K flip flop 201 disables the ON/OFF function for the MANUAL mode while the evaporative cooler is in the TIMER mode. Two conditions must be met in order to obtain a high signal from AND gate 232. The first condition is that ON/OFF switch 226 must be actuated, and the second condition is that ON ONE HOUR, LO MOTOR or HI MOTOR must be on. Similarly, two conditions must be met in order to obtain a high signal from AND gate 122. First, AND gate 232 must be high. Second, the TIMER mode must have been selected using time function switch 130. When these conditions are met, AND gate 122 will issue a signal that will toggle J/K flip flop 452 and reset the ON/OFF line of clock chip 102. This occurs when the ON/OFF switch 226 is actuated to turn the evaporative cooler off when it is operating in the on portion of the timing cycle. If the ON/OFF switch 226 is actuated when the evaporative cooler is operating in the off portion of the timing cycle in the TIMER mode, AND gate 215 will issue a signal that will toggle J/K flip flop 452.

A source of AC line voltage for powering the evaporative cooler is connected through a fuse 503 and across the primary windings of transformer 502. The secondary windings of transformer 502 provide a reduced AC voltage to a bridge rectifier 501. The negative side of bridge rectifier 501 is connected to DC ground, and the positive side is connected to the IN (input) line of voltage regulator 507 and filter capacitor 508. The REF (reference) line of voltage regulator 507 is connected to DC ground, and the OUT (output) line of voltage regulator 507 is connected to storage capacitor 506 to provide a source of DC operating power for the evaporative cooler electronics.

When AC power is initially applied to the evaporative cooler or reset switch 545 is actuated, time/oscillator 548 is triggered, thereby initializing decade counter/dividers 138 and 320, J/K flip flops 201 and 452, timer/oscillators 220, 229, 241, 330, 346, 351, 406, 437, 447, and parallel/serial shift register 421.

We claim:

1. Apparatus for controlling the operation of an evaporative cooler of the type having a frame supporting a plurality of cooler pads, a water reservoir, a water pump for circulating water from the water reservoir onto the cooler pads, and a blower fan centrally located within the frame for drawing outside air through the cooler pads and for discharging it into a duct distribution system, the apparatus comprising:
   clock means, including a clock display and clock controls, for enabling the user to set and view a current time, a desired on time, and a desired off time;
   switching means coupling said clock means to said water pump and to said blower fan, said switching means being responsive to said clock means for initiating operation of said water pump and said blower fan at the desired on time and for halting operation of said water pump and said blower fan at the desired off time.

2. Apparatus for controlling the operation of an evaporative cooler as in claim 1 further comprising function selection means for allowing the user to select one of a plurality of predetermined combinations of blower fan speed and water pump operating modes.

3. Apparatus for controlling the operation of an evaporative cooler as in claim 2 further comprising status indicator means for indicating to the user the selected one of said plurality of predetermined combinations of blower fan speed and water pump operating modes.

4. Apparatus for controlling the operation of an evaporative cooler as in claim 1 further comprising time function selector means, coupled to said clock means, for enabling the user to manually control operation of the evaporative cooler without thereby altering said current time, on time, and off time set by the user.

5. Apparatus for controlling the operation of an evaporative cooler as in claim 4 further comprising time function indicator means for providing a visual indication to the user of a selected one of a plurality of predetermined time functions.

6. Apparatus for controlling the operation of an evaporative cooler as in claim 1 further comprising manually operated ON/OFF switch means for temporarily overriding said clock means such that said evaporative cooler is turned on, when off, until said desired off time has been reached and such that said evaporative cooler is turned off, when on, until said desired on time has been reached.

7. Apparatus for controlling the operation of an evaporative cooler as in claim 1 further comprising pre-wet cycle control means for initiating operation of the water pump for a pre-wet cycle period of time and for inhibiting operation of the blower fan during that pre-wet cycle period of time.

8. Apparatus for controlling the operation of an evaporative cooler as in claim 7 further comprising pre-wet cancel means for enabling the user to selectively override said pre-wet cycle control means.

9. Apparatus for controlling the operation of an evaporative cooler as in claim 1, further comprising one-hour cycle means for enabling the user to initiate and maintain operation of the water pump and blower fan for a predetermined period of time, without regard for a desired on time and a desired off time previously set by the user.

10. Apparatus for controlling the operation of an evaporative cooler as in claim 9 wherein said one-hour cycle means includes means enabling the user to vary said predetermined period of time.

11. Apparatus for controlling the operation of an evaporative cooler as in claim 3 further comprising a plurality of diagnostic indicators for indicating to the user the operational status of the water pump and blower fan.

* * * * *